United States Patent [19]

Gethke et al.

[11] Patent Number: 4,874,133
[45] Date of Patent: * Oct. 17, 1989

[54] GAS SUPPLY AND DISTRIBUTION CENTER

[76] Inventors: Hans-Gerd Gethke, Auf der Höhe 4, D-5107, Steckenborn, Japan; Detlef Eitner, Grunenthal 12, D-5100, Aachen, Japan; Friedel Engelhard, Aiselsfeld 7, D-5204, Lohmar 21, Japan

[*] Notice: The portion of the term of this patent subsequent to Nov. 22, 2005 has been disclaimed.

[21] Appl. No.: 259,410

[22] Filed: Oct. 17, 1988

Related U.S. Application Data

[60] Continuation of Ser. No. 177,240, Apr. 4, 1988, abandoned, which is a division of Ser. No. 028,417, Mar. 20, 1987, Pat. No. 4,786,297.

[30] Foreign Application Priority Data

Oct. 9, 1986 [DE] Fed. Rep. of Germany ....... 3634377

[51] Int. Cl.4 .............................................. B05B 1/14
[52] U.S. Cl. ..................................... 239/555; 428/60; 428/89; 405/43
[58] Field of Search ................... 55/259, 529; 428/60, 428/89; 52/595, 607; 405/45, 43; 239/555

[56] References Cited

U.S. PATENT DOCUMENTS 1,485,309 2/1924 Steward ................................ 52/607
2,386,020 10/1945 Wendelken ........................... 405/43
4,786,297 11/1988 Gethke et al. ....................... 55/259

FOREIGN PATENT DOCUMENTS 8512795 8/1985 Fed. Rep. of Germany .
190593 9/1985 Japan ................................. 239/555

Primary Examiner—Bernard Nozick
Attorney, Agent, or Firm—Diller, Ramik & Wight

[57] ABSTRACT

The gas supply and distribution means comprises at least one gas distribution plate (13) composed of shaped blocks (14) through which extend gas ducts (15) having exit slots at the top sides of the shaped blocks. The gas distribution plate (13) is loaded with bulk material. The device may be used for instance as a gas cleaning plant, ret plate in composting systems, and as a combined gas cleaning and ret plate. The gas distribution plate (13) is enclosed at least partly by a collecting channel (16). Raw gas is fed through gas line (36) into an inlet chamber (25) from where it flows into the collecting channel (16) to be distributed from there to the gas ducts (15). The gas distribution plate (13) has an inclined runoff thus enabling excess water present in the filter medium to flow into the collecting channel (16) and from there, through a water conduit (26) to the inlet chamber (25) which contains a water reservoir and a spraying means to moisten raw gas prior to its distribution.

11 Claims, 4 Drawing Sheets

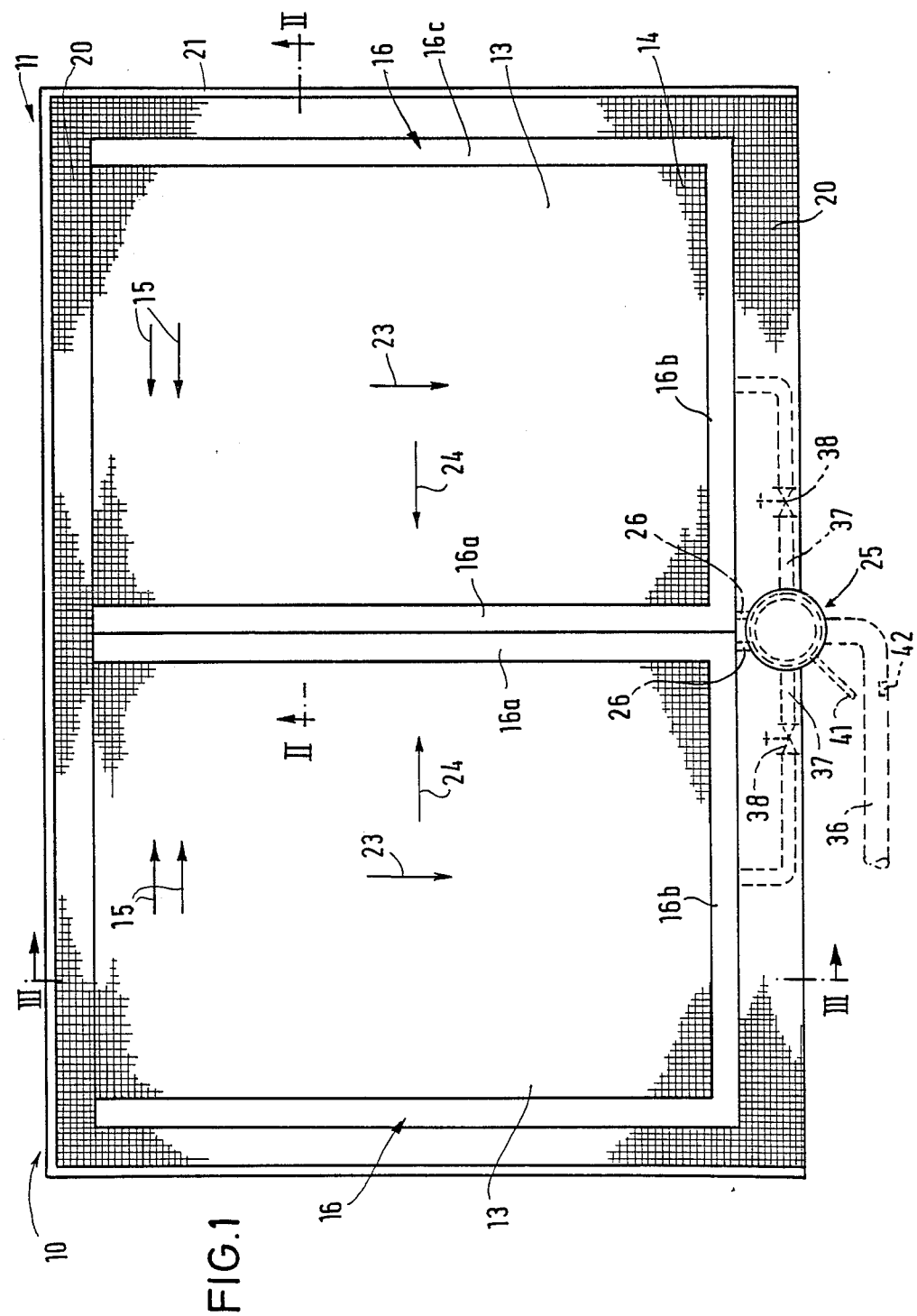

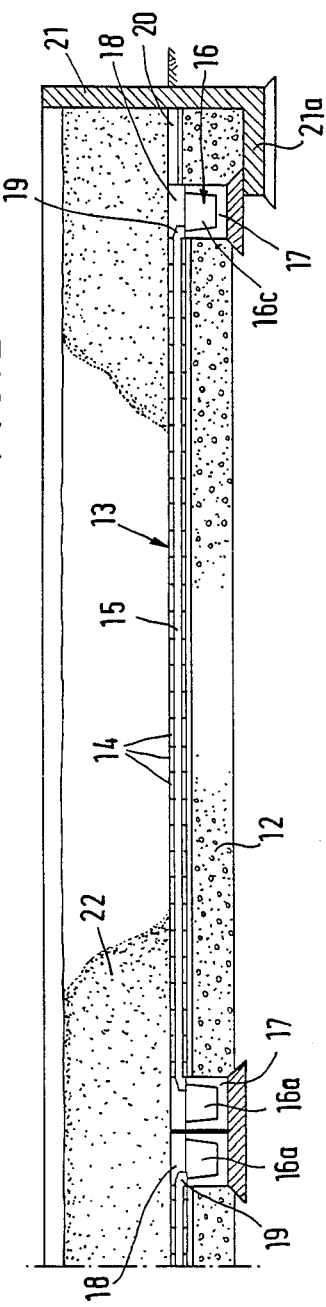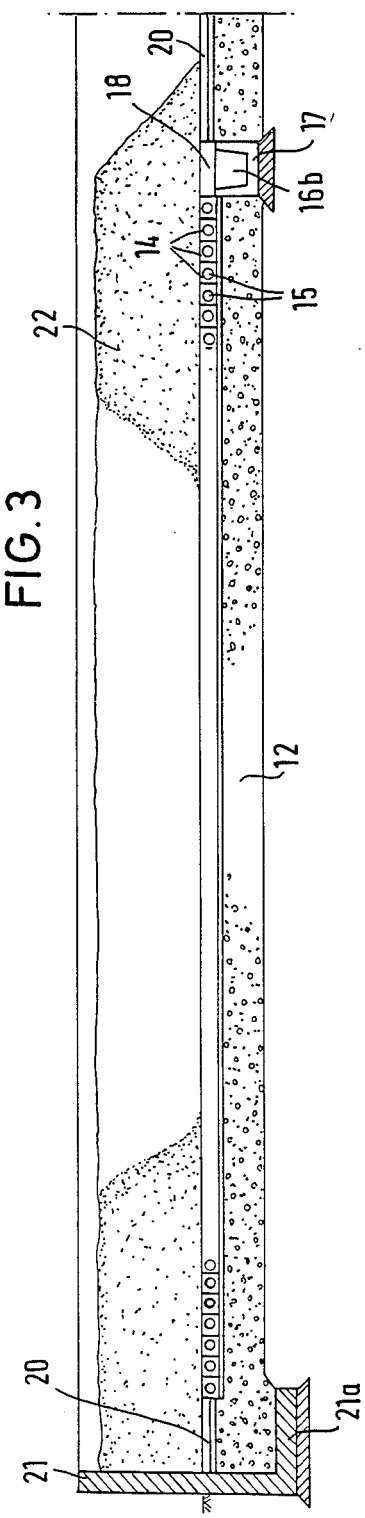

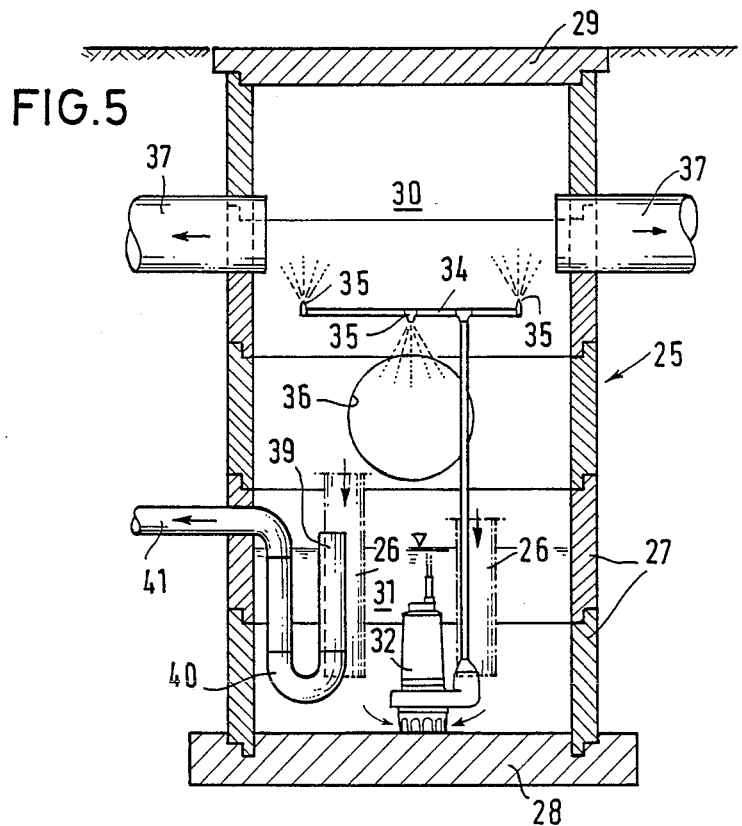

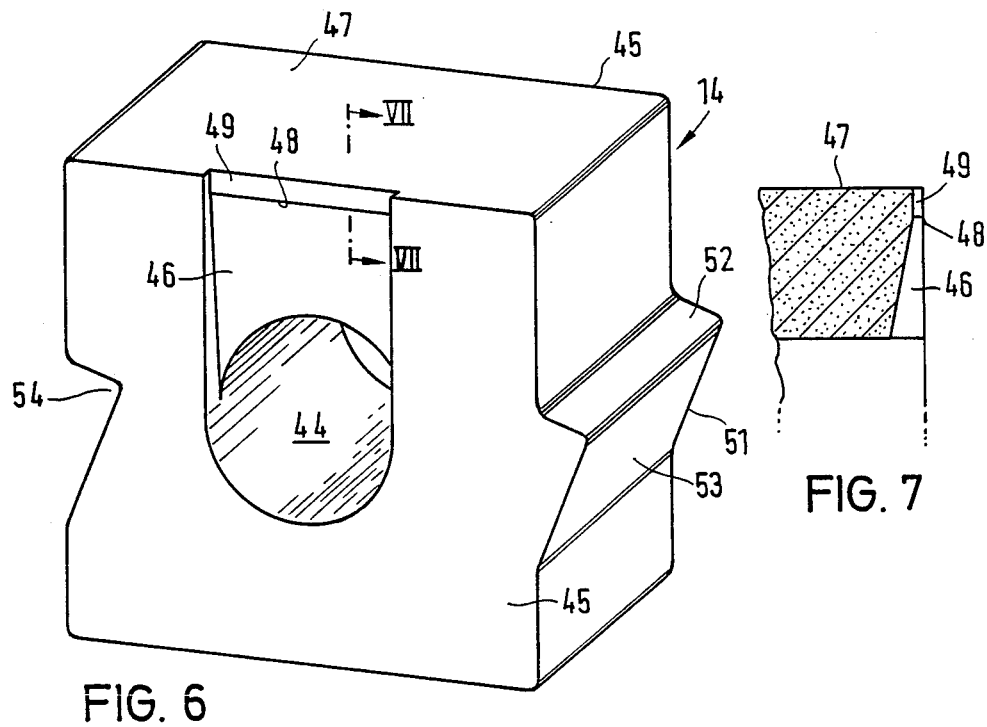
FIG. 6
FIG. 7
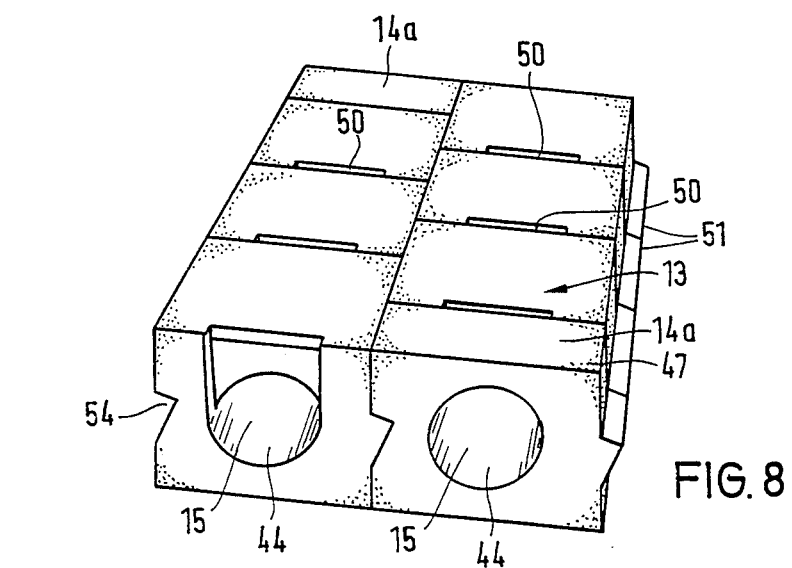
FIG. 8

GAS SUPPLY AND DISTRIBUTION CENTER

This application is a continuation of application Ser. No. 177,240, filed 4/4/88, now abandoned, which is a divisional application of 028,417of 3/20/87, now U.S. Pat. No. 4,786,297.

Gas Supply and Distribution System

The invention relates to a gas supply and distribution system.

A known gas supply and distribution means of this type (German Journal: Umwelt No. 3/85, Supplement page 30) is used as a biofilter equipment with the object of cleaning gas in that the (contaminated) raw gas is passed through biologically active bulk material such as for instance compost, wood chips, peat etc. According to the biological exhaust air treatment procedure, it is intended to decompose biologically degradable substances in an aerobic metabolic reaction. The microbial exhaust air cleaning is performed in two steps: 1. sorption of the odorous substances in liquid phase and 2. microbial oxidation by organisms. Regardless of the type and kinetics of the sorptive operation, sorptivity is to be maintained also in continuous service. To this effect, use is made of the active microorganisms which, by oxidation of the components, are responsible for a continuous biochemical regeneration process. In a microbial gas cleaning equipment, raw gas is conducted into the interior of a gas distribution plate to be discharged and distributed through the exit openings and to flow subsequently through the filter medium. For the operation of the biological gas cleaning plant, care is to be taken, on the one hand, that the filter medium does not become too wet by rainfalls, with a resultant inhibitive gas passage, and with the formation of reduction zones, and, on the other hand, it is necessary to ensure a certain humidification, thus promoting microbial growth. Normally, such gas cleaning assemblies are provided with a draining system to evacuate rain water and excess conditioning and condensate water. Further, to inhibit dry-out, raw gas is wetted prior to its entry into the bulk material.

It is the object of the invention to provide a gas supply and distribution system; and of the kind specified in which ventilation, humidification and drainage of bulk material are performed by low expenditure and by utilizing the same channel system.

The gas supply and distribution means of the invention is particularly suited for gas cleaning assemblies in which the gas to be cleaned is conducted through the flatly distributed bulk material filter. The invention is further applicable to composting systems for organic waste (ret plate). Composting is a biological-chemical reaction, for which the participating microorganisms are in need of a sufficient amount of oxygen and water. Due to the gas supply and distribution means of the instant invention, the required conditions are ensured by the introduction of air or oxygen, called hereinafter raw gas, into the bio material. Relative humidity of gas is automatically adjusted to the value required for composting and irrespective of the absolute saturation value of raw gas, for instance, in case of changing marginal condition due to atmospheric influences.

The bulk material of a composting assembly consists of the material to be composted which, upon termination of composting, is removed again to be replaced by new bulk material. In other words, the bulk material is the material to be treated by the equipment while, in case of a gas cleaning plant, the material under treatment is raw gas which is cleaned as it passes through the bulk material.

The gas supply and distribution means of the invention may be also used as a combined gas cleaning and ret plate, and, if so, not only gas cleaning but also composting is performed this way.

In the gas supply and distribution means of the invention, raw gas, prior to flowing into the distribution plate, is first fed to a closed inlet chamber where it is wetted by a spraying device. In other words, raw gas is enriched with water to subsequently flow through the bulk material. Subject to the gas distribution, the bulk material is humidified, and the points loaded most of all by raw gas, are also provided with the highest amount of humidity. It is not necessary to provide a sprinkler covering the total surface of the filter plate. The inlet chamber additionally may perform the following functions:

mixing of different gas currents,
compensating pressure
distributing gas,
collecting percolating and condensate water,
separating solids.

The invention may not be used only for biological composting and gas cleaning plants but also for all gas cleaning equipments in which bulk material is accumulated as a filter medium on a distributor plate. The filter medium may be also consist, for instance a mineral granular material, and humidification contributes to an increased adsorptivity.

According to a preferred embodiment of the invention, the gas distribution plate comprises an inclined runoff and a collecting channel which extends into the inlet chamber. Rain water and/or percolating and condensate waters are thus carried away via the inclined runoff and the collecting channel. Said excess waters which are not received by the filter medium, flow into the inlet chamber and may be later used for wetting purposes. By said cycling system, high quantities of excess water need not be branched off nor need they undergo a probable separate treatment. If the bulk material is too humid, the spraying means will be disconnected either manually or by the control of humidity sensors. The humidity of raw gas also influences the decision whether or not to operate the spraying means. Preferably, the latter is controlled responsive to the humidity contents of the bulk material and of the raw gas.

The inlet chamber suitably contains a water reservoir from which a pump delivers water to the overlying spraying device, whereby part of the sprayed water drops to return into the reservoir. The inlet chamber is a space closed pressure- and gas- tightly and in which excess pressure is caused by the introduced raw gas, said inlet chamber being not only provided for collecting and distributing raw gas if a number of raw gas lines are connected to one and the same gas supply and distribution means, but it also acts as a moistening and pressure compensating unit. In fact, raw gas is rendered turbulent, mixed as well as moistened there. Hence, it is suitable for the design of the inlet chamber to ensure a turbulence as strong as possible thus causing gas in said inlet chamber to flow along a path as long as possible. Therefore, the inlet chamber may be also used as a distribution chamber for the supply to a number of sections of a gas cleaning plant.

The collecting channel by which the excess water is carried away from the gas distribution plate may be used simultaneously as a gas channel for supplying raw gas from the inlet chamber to the gas distribution plate. Preferably, the inlet chamber is provided near the deepest point of the gas distribution plate thus enabling rain water to flow directly into the inlet chamber without any pump operation. Due to the double utilization of the collecting channel as a water duct and for gas transportation purposes, the design of the gas supply and distribution means is particularly simple and cost-saving.

The invention also relates to a shaped block for the gas distribution plate of a gas supply and distribution means comprising a channel extending intermediate two end sides and being connected at one of said end sides by a recess to an outside. Said shaped block of the invention is characterized in that the recess substantially occupies half the channel cross section and forms at the center of the top a slot extending transversely to the channel. Such a shaped block may be produced by simple means because the recess is provided at one end side thus allowing the outflow of a relatively high gas volume without the risk of clogging for the outlet slots formed between two shaped stones placed against one another. The shape and size of the slot may be varied responsive to the dimensions and construction conditions of the gas supply and distribution means and to the operational needs (surface and volume load). Shape and size of the slots are also dictated by the type of filter medium used. It is also possible to use within one and the same gas supply and distribution means different slot sizes and shapes at different points of the gas distribution plate in order to realise a specific flow distribution of the raw gas leaving the gas distribution plate.

An embodiment of the invention will be explained hereunder in more detail concerning a gas cleaning plant, with reference to the drawings in which FIG. 1 is a plan view of a gas cleaning plant consisting of two fields, FIG. 2 is a section along line II—II of FIG. 1, FIG. 3 is a section along line III—III of FIG. 1, FIG. 4 is a plan view of the inlet chamber, FIG. 5 is a section along V—V of FIG. 4, FIG. 6 is a perspective view of a shaped block to form the gas distribution plate, FIG. 7 is a scaled-up view of a section along line VII—VII of FIG. 6 and FIG. 8 shows a perspective view of a number of shaped blocks placed against one another for the formation of a gas distribution plate.

The illustrated gas cleaning plant comprises two rectangular fields 10, 11 which are provided in the open air and adapted each to be passable by commercial vehicles. The gas cleaning plant is based on a given screen size. The used elements are mostly prefabricated concrete parts. Each of the coherent fields 10, 11 is disposed on a bed 12 which consists for instance of a pebble surface or of a concrete plate, bed 12 forming the base for the gas distribution plate 13 and having the resistance required to carry high loads and to distribute them on the ground. The gas distribution plate 13 of each field consists of a number of shaped blocks 14 which are arranged on bed 12. The shaped blocks whose construction will be still explained hereunder form parallel gas ducts 15 extending in the direction indicated by arrows in FIG. 1.

Three sides of the gas distribution plate 13 are limited by a collecting channel 16, and at the adjacent sides of fields 10, 11, the parallel sections 16a of the gas supply channels are directly adjoined, while sections 16b situated at right angles thereto, extend along a common straight line in opposite directions and sections 16c arranged in parallel to sections 16a, are joined to the outermost end of each section 16b. Only the sides of the gas distribution plates 13 which are situated oppositely to sections 16b are not limited by collecting channel 16.

Said collecting channel 16 consists of trough-shaped concrete blocks 17 placed against one another and whose open top side is covered by a cover plate 18. As evident from FIG. 2, said cover plates 18 are provided with passages 19 of a favorable flow configuration which connect the interior of the collecting channel 16 with the side face of said cover plate. Against said side surfaces of the cover plates 18, there are placed in sections 16a and 16c the end sides of shaped blocks 14 thus enabling passages 18 to communicate with the gas supply channels 15. By this means, gas may flow from a channel 16 into the gas ducts 15 extending at right angles thereto.

Each gas distribution plate 13 is surrounded by a marginal strip of pavement stones or the like suited for vehicles to travel thereover. The top sides of the pavement stones are at the same height as those of the shaped blocks 14. There is no adjacent marginal strip only at the directly contiguous sections 16a at which the gas distribution plates of two fields 10 and 11 are in contiguity. Marginal strip 20 also resting on bed 12 surrounds two contiguous fields 10 and 11 and is encompassed at three sides by an upright wall 21 which underengages by an L-shaped leg 21a the edge of bed 12.

On gas distribution plates 13, collecting channels 16 and marginal strip 20, a filter medium 22 is highly heaped which, as a rule, consists of a biologically active bulk material, e.g. compost, peat or the like, being transported to the gas distribution plates by way of trucks, while the material is heaped to form a layer of uniform thickness as high as 1.20 m or so by broaching vehicles. Wall 21 forms the vertical limitation of the layer of filter medium 22, which may form a slope on marginal strip 20 only on the side which is not limited by wall 21 (see FIG. 3 right-hand).

Each gas distribution plate 13 is mounted to include an inclined runoff thus ensuring that excess water from the filter medium 22 on the gas distribution plate may run away. One gas distribution plate has an inclination of 1:100 in the direction of arrow 23 (FIG. 1), i.e. towards section 16b of the collecting channel 16, and it is also inclined in the direction of arrow 24, i.e. towards section 16a. Near the points where sections 16a and 16b are in contiguity, there is the inlet chamber 25 situated at the deepest point of the collecting channel 16 in order to allow for water having penetrated anywhere the collecting channel to flow to said deepest point. By one water conduit 26 each, the inlet chamber 25 communicates with the deepest point of the collecting channel 16 of each gas distribution plate 13.

The inlet chamber or tubular chute 25 shown in more details in FIGS. 4 and 5, is embedded in the soil and formed by tubes 27 or prefabricated concrete parts (chute rings, well rings, elements of rectangular cross section etc.), the lower limitation of the chute being formed by bottom plate 28 and the upper limitation by the gas-tight cover plate 29. The inner space 30 of the chute is sealed to be pressure-tight against the environment. In the lower region of the inlet chamber 25, there is accommodated a water reservoir 31 in which a plunger pump 32 is disposed on the bottom plate 28. The ends of the water conduits 26 connected to the collecting channel 16 are dipping into the water reservoir 31 and are spaced slightly above the bottom plate 28 beneath the water level in the inlet chamber 25. From the plunger pump 32, a rising pipe extends to the spraying means 34 situated in the upper region of the inlet chamber, i.e. above the water reservoir 31, and consisting of a horizontal annular conduit comprising a number of spray nozzles 35 pointing to different directions. In winter, the operation is also ensured in case of frosty weather because freezing is avoided by means of waste heat of the raw gas.

Above the surface of the water reservoir 31 and beneath the spraying means 34, a raw gas conduit 36 laterally enters; and the inlet chamber 25, while from the region above the spraying means 34, pipe lines 37 extend out of the inlet chamber 25 of which each is connected to the collecting channel 16 of one of the gas distribution plates 13. Pipe line 37 ends in the central region of each section 16b of the collecting channel 16 (FIG. 1.). Each pipe line 37 containing a valve 38, to permit to separately connect and disconnect each of the fields 10, 11.

As obvious from FIGS. 4 and 5, seen in plan view, the raw gas conduit 36 ends in the inlet chamber 25 at right angles to the pipe lines 37, and at a level other than that of said pipe lines. Hence, the gas to be cleaned and supplied by raw gas conduit 36 is repeatedly deviated in the inlet chamber 25, it is rendered turbulent prior to flowing into the pipe lines 37. It is possible to connect to the inlet chamber 25 a number of raw gas lines 36 which may originate from different raw gas sources. If so, the inlet chamber 25 simultaneously acts as a distributing and mixing device, and, furthermore, it causes a pressure compensation, if the supply pressures of the different raw gas sources vary from one another.

Furthermore, there ends in the inlet chamber 25 a (non-illustrated) water conduit connected to the water supply system, and containing a level-controlled valve so that, in case of water shortage, the level of the water reservoir 31 may be kept constant by external water supply. The water reservoir 31 is connected with an overflow pipe 39 joined to a waste water line 41 via a siphon 40, the overflow pipe 39 evacuating water from the inlet chamber in case of water surplus.

The operation of the gas cleaning plant will be explained hereunder as follows: Raw gas supplied through the raw gas line 36 first flows into the inlet chamber 25 to there undergo strong turbulences and to be simultaneously sprayed with water from the spraying means 34. The moistened raw gas is fed via pipes 37 to fields 10 and 11. Raw gas fed to section 16b of the collecting channel 16 may not penetrate into the gas ducts 15 extending in parallel thereto. Therefore, it goes on flowing into the sections 16a and 16c to get then through passages 19 into the gas ducts 15, which comprise a plurality of upwardly directed slots 50 (FIG. 8); and through which raw gas flows from below against filter medium 22. In other words, gas flows from below upwardly through the filter medium 22 to thus be cleaned by the system mentioned already above, and to leave the top side of the heaped filter medium layer as pure gas dismissed into the surroundings. As the raw gas flows through the filter medium, humidity contained in it is left there and the filter medium is uniformly wetted this way.

Surplus water which, e.g. by rain, has entered the filter medium 22, escapes through the slots 50 of the shaped blocks 14 into the gas ducts 15 to be diverted into the collecting channel 16 from which water flows through water conduit 26 into the inlet chamber 25 and from there into the water reservoir 31. In case of a later demand for moistening raw gas through the spraying means 34, said water is available again. The cross section of water conduit 26 is substantially smaller than that of the collecting channel 16. Due to the throttle effect of water line 26 and by the counter-pressure of the water reservoir 31, gas is prevented from flowing from the collecting channel 16 back into the inlet chamber 25.

By its natural water retentivity, the filter medium 22 is capable of automatically retaining the water amount required by it while surplus amounts of water are released. On the other hand, wetting of the filter medium is ensured by the raw gas from below so that points of the filter medium which are subjected to the most intense raw gas flow, to a high temperature (from raw gas) and to a strong biological activity are also provided with the maximum amount of moisture.

The raw gas line 36 preferably accommodates a humidity sensor 42 (FIG. 1) to adjust the spraying means 34 via a (non-illustrated) controller responsive to the humidity contents of the supplied raw gas.

FIGS. 6 to 8 show the construction of the shaped blocks 14 of which the gas distribution plate 13 is composed, each of the shaped blocks 14 being square-shaped, while a cylindrical gas channel 44 extends from one end side 45 to the other. If the end sides of a number of shaped blocks 14 are placed against each other, channels 44 form the gas duct 15 (FIG. 8). Two adjacent rows of shaped blocks 14 are always offset by half a block width, or mounted to be staggered. To ensure that two adjacent rows of shaped blocks make flush with each other, use is made of half blocks 14a which may consists of one half of a centrally severed shaped block 14.

One of the end sides 45 of the shaped block 14 is provided with a recess 46 occupying the upper half of channel 44 and extending as far as to the top side 47 of the shaped block, said recess 46 being confined by two nearly parallel vertical side walls which are closely joined tangentially to the circular cross section of channel 44. The depth of recess 46 continuously decreases from channel 44 upwardly as far as to an edge 48. The overlying section 49 is of a constant depth to the top side 47 and thus extends in parallel to the end side 45.

If shaped blocks according to FIG. 8 are placed against one another, the end side provided with the recess 46 forms with the plane end side of an adjacent shaped block a slot 50 through which gas from the gas duct 15 may escape upwardly. The recesses 46 form nozzles of a cross section reduced upwardly so that gas flows out of slots 50 at a relatively high speed thus inhibiting clogging of said slots with filter medium. The slots are relatively narrow, however, due to their considerable length, their cross section is relatively large. As a result of their shape disclosed above, the flow resistance of the recesses 46 is low.

Due to the inclined outlet marked by arrows 23 and 24, surplus water may flow on top of the shaped molds into the collecting channel 26, and part of said excess water flows through slots 50 into the gas ducts 15 through which it also gets into the collecting channel 16.

As evident from FIG. 6, one side wall of the shaped blocks 14 comprises a wedge-shaped projection 51, to which corresponds a recess 54 adapted to the former in shape and size on the opposite side wall. Projection 51 and recess 54 are provided in parallel to the side edges over the total depth of the shaped block, i.e. in parallel to channel 44. The top side 52 of the triangular projection 51 flatly descends externally while the underside 53 meets the side surface at an acute angle. The triangular recess 54 on the opposite side is designed in conformity therewith. If two rows of blocks are placed against one another in accordance with FIG. 8, the projection 51 of one row mates with the recesses 54 of the adjacent row. Since the shaped blocks of two rows are offset against each other, each projection 51 engages the recesses of two shaped blocks of the adjacent row.

Due to the disclosed shape of projections 51 and recesses 54, the load acting on one shaped block is uniformly transmitted to the adjacent block thus excluding excessive loads on individual shaped blocks. The flat top side 52 of projection 51 accepts the load which is introduced into the mold block under favorable static conditions due to the inclined underside 53. The projections 52 and recesses 54 are situated nearly centrally in the block height, preferably, however, slightly beneath the center so that overlying horizontal regions of the side faces may form an abutment for a probably laterally adjacent pavement of stones of a low height.

What is claimed is:

1. A gas duct comprising at least two blocks each having opposite first and second faces, the first and second faces of adjacent blocks being in abutment with each other, a gas channel in each block extending between the first and second faces thereof, said gas channels being in fluid communication with each other, each block having an upper surface, a recess in each block first face extending between the associated gas channel and the upper surface thereof thereby defining with the adjacent block second face a gas exit aperture, each block includes opposite third and fourth faces provided with respective complementary contoured projections and recesses adapted to interdigitate adjacent gas ducts, each gas channel being defined by an interior peripheral surface of a predetermined peripheral configuration having a maximum transverse dimension as defined by a transverse plane through each gas channel, and each recess and gas exit aperture having a transverse size at least equal to said maximum transverse dimension whereby a substantial portion of each gas channel is exposed directly to atmosphere through its associated recess and gas exit aperture.

2. The gas duct as defined in claim 1 wherein each block includes a generally flat uni-planar top face.

3. The gas duct as defined in claim 1 wherein each first face is generally flat and uni-planar.

4. A gas duct comprising at least two blocks each having opposite first and second faces, the first and second faces of adjacent blocks being in abutment with each other, a gas channel in each block extending between the first and second faces thereof, said gas channels being in fluid communication with each other, each block having an upper surface, a recess in each block first face extending between the associated gas channel and the upper surface thereof, and each block second face having a surface devoid of a recess opposing the first face recess and defining with the adjacent block second face a gas exit aperture.

5. The gas duct as defined in claim 4 wherein each gas channel is defined by an interior peripheral surface of a predetermined peripheral configuration having a maximum transverse dimension as defined by a transverse plane through each gas channel, and each recess and gas exit aperture having a transverse size at least equal to said maximum transverse dimension whereby a substantial portion of each gas channel is exposed directly to atmosphere through its associated recess and gas exit aperture.

6. A block adapted to form a relatively long gas duct when associated with other similar blocks, said block comprising opposite first and second faces, a gas channel in said block extending between said first and second faces, said block having an upper surface, a recess in said block first face extending between said gas channel and the upper surface thereof, and said block second face being devoid of a recess whereby said block second face when opposing a first face recess of another similar block defines therewith a gas exit aperture opening through said upper surface.

7. The block as defined in claim 6 wherein said block includes opposite third and fourth faces provided with respective complementary contoured projections and the recesses adapted to interdigitate with adjacent blocks.

8. The block as defined in claim 7 wherein said block includes a generally flat uni-planar top face.

9. The block as defined in claim 6 wherein said gas channel is defined by an interior peripheral surface of a predetermined peripheral configuration having a maximum transverse dimension as defined by a transverse plane through said gas channel, and each recess and gas exit aperture having a transverse size at least equal to said maximum transverse dimension whereby a substantial portion of said gas channel is exposed directly to atmosphere through its associated recess and gas exit aperture.

10. The gas duct as defined in claim 9 wherein each block includes a generally flat uni-planar top face.

11. The gas duct as defined in claim 6, wherein each block includes a generally flat uni-planar top face.

* * * * *